(12) United States Patent
Zhao

(10) Patent No.: US 10,557,991 B2
(45) Date of Patent: Feb. 11, 2020

(54) HEATING TANK FOR THE FUSION SPLICER AND A FUSION SPLICER

(71) Applicant: INNO INSTRUMENT (CHINA) .INC, WeiHai (CN)

(72) Inventor: Yangri Zhao, WeiHai (CN)

(73) Assignee: INNO INSTRUMENT (CHINA) .INC, Weihai (CN)

( * ) Notice: Subject to any disclaimer, the term of this patent is extended or adjusted under 35 U.S.C. 154(b) by 182 days.

(21) Appl. No.: 15/847,500

(22) Filed: Dec. 19, 2017

(65) Prior Publication Data

US 2018/0356594 A1    Dec. 13, 2018

(30) Foreign Application Priority Data

Jun. 8, 2017    (CN) .......................... 2017 1 0426065

(51) Int. Cl.
| | |
|---|---|
| *B29C 61/02* | (2006.01) |
| *B29C 63/42* | (2006.01) |
| *G02B 6/255* | (2006.01) |
| *B29C 63/00* | (2006.01) |
| *B29L 11/00* | (2006.01) |

(52) U.S. Cl.
CPC ............ *G02B 6/2551* (2013.01); *B29C 61/02* (2013.01); *B29C 63/0004* (2013.01); *G02B 6/2557* (2013.01); *G02B 6/2558* (2013.01); *B29C 63/42* (2013.01); *B29L 2011/0075* (2013.01); *G02B 6/2553* (2013.01)

(58) Field of Classification Search
CPC ..... B29C 61/02; B29C 63/0004; B29C 63/38; B29C 63/42; B29L 2011/0075; G02B 6/2551; G02B 6/2553; G02B 6/2557; G02B 6/2558
See application file for complete search history.

(56) References Cited

U.S. PATENT DOCUMENTS 4,764,662 A * 8/1988 Andersen ................ B29C 63/42
174/DIG. 8
5,384,889 A * 1/1995 Cook .................... B29B 13/023
219/385

(Continued)

*Primary Examiner* — Michael A Tolin
(74) *Attorney, Agent, or Firm* — Anova Law Group, PLLC

(57) ABSTRACT

The present invention discloses a new and efficient heating tank for the fusion splicer and a fusion splicer, which comprises a heating tank body and a heating tank upper cover, among which, the said heating tank body is used to accommodate a heat shrinkable tube wrapped with a fiber welding point and heated to shrink the heat shrinkable tube, and the said heating tank body comprises a heating side surface and a heating bottom surface, while the said heating side surface and the heating bottom surface are connected with each other, and the heat shrinkable tube is in contact with at least either the heating side surface or the heating bottom surface during the preheating and thermal shrinkage; the said heating tank upper cover comprises a pressing portion, while the said pressing portion is narrower than the opening of the said heating tank body, and comes into contact with the heat shrinkage tube and exerts an acting force during the preheating and thermal shrinkage of the tube. The invention can speed up the thermal shrinkage process, reduce the heat shrinkage time, greatly improve the heat conduction efficiency, and reduce the cost, be more environment-friendly.

12 Claims, 7 Drawing Sheets

(56) References Cited

U.S. PATENT DOCUMENTS

| | | | | |
|---|---|---|---|---|
| 6,583,390 B1* | 6/2003 | Vetrano | ............... | B29C 61/00 |
| | | | | 219/385 |
| 7,212,718 B2* | 5/2007 | Sato | ............... | G02B 6/2553 |
| | | | | 219/520 |
| 8,866,051 B2* | 10/2014 | Zamzow | ......... | B29D 11/00663 |
| | | | | 219/201 |
| 9,134,480 B2* | 9/2015 | Liu | ............. | G02B 6/2558 |
| 2013/0230286 A1* | 9/2013 | Fukuda | ............. | G02B 6/255 |
| | | | | 385/96 |
| 2013/0284377 A1* | 10/2013 | Takayanagi | ......... | G02B 6/2553 |
| | | | | 156/433 |

* cited by examiner

HEATING TANK FOR THE FUSION SPLICER AND A FUSION SPLICER

CROSS-REFERENCE TO RELATED APPLICATIONS

This application claims the priority of Chinese Patent Application No. CN201710426065.6, filed on Jun. 8, 2017, the content of which is incorporated herein by reference in its entirety.

TECHNICAL FIELD

The present invention relates to the field of fusion splicing, specifically to a new and efficient heating tank for the fusion splicer and a fusion splicer with this heating tank.

BACKGROUND

The fiber connector splicing usually comprises two main processes, in which, one is the welding process, including propulsion, alignment, discharge, estimated loss, and the other is the thermal shrinkage process, after the fiber is melted and spliced, a heat shrinkable tube is required to cover the welding point and the the heat shrinkable tube is put into the heating tank of the heat shrinkable device for thermal shrinkage and reinforcement.

In the thermal shrinkage process, the heating tank is heated to shrink the heat shrinkable tube due to heat, which covers the welding point, to achieve the purpose of strengthening the welding point. At present the common heating tank takes a long heating time, resulting in a long thermal shrinkage time and low efficiency. The reason is that the common heating tank is used with a ceramic heating plate, the heating part cannot be quickly heated and the mass production is at risk; the heating parts of some individual heating tanks are used with PI (polyimide) heating film to wrap aluminum products with adhesives, resulting in high material cost, and expensive price; the heat conduction efficiency of the heating tank structure of existing fusion splicers is also low.

Patent CN201420372104.0 already disclosed by the applicant discloses an efficient heating tank, which effectively solves the problem of low heating efficiency or high cost of existing heating tanks. However, with the ever increasing scope of fiber construction and the improvement of fiber splicing speed, the increase for thermal shrinkage efficiency in the industry is more demanding.

SUMMARY

The problem to be solved by the present invention is to solve the above-mentioned drawbacks of the prior art, to provide a new and efficient heating tank for the fiber splicer which is low in cost and capable of further rapidly performing heat shrinkage to improve the overall efficiency of optical fiber welding, as well as a fusion splicer used with this heating tank.

The technical problem of the invention can be solved by the following technical proposals:

A heating tank for the fusion splicer, which comprises a heating tank body and a heating tank upper cover, among which, the said heating tank body is used to accommodate a heat shrinkable tube wrapped with a fiber welding point and heated to shrink the heat shrinkable tube.

Preferably, the said heating tank body comprises a heating side surface and a heating bottom surface, while the said heating side surface and the heating bottom surface are connected with each other, and the heat shrinkable tube comes into contact with at least either the heating side surface or the heating bottom surface during the preheating and thermal shrinkage;

the said heating tank upper cover comprises a pressing portion, while the said pressing portion comprises a deformable elastic mechanism, and it is narrower than the opening of the said heating tank body, and comes into contact with the heat shrinkage tube and exerts an acting force during the preheating and thermal shrinkage of the tube.

Further, the pressure generated by the deformation of the elastic mechanism of the said pressing portion is smaller than the pressure required for the deformation of the heat shrinkable tube casing in the unheated state and is larger than the pressure required for the deformation of the heat shrinkable tube casing to be heated and softened during heating; in the unheated state, the elastic mechanism of the said pressing portion is in a contracted state, during the preheating and heat shrinkage, the elastic mechanism of the said pressing portion is gradually opened, comes into contact with the heat shrinkable tube and exerts an acting force.

Further, the material of the said pressing portion is a high temperature resistant soft material, and is preferably a high temperature resistant foam plastic.

Further, the heating surface of the said heating tank body is a heat generating element having a heat generating function per se or a surface having a heat conduction component connected to the heat generating source.

Further, the said heating side comprises two heating surfaces, and an included angle is formed between the said two heating surfaces or the extended planes thereof, and the said heating bottom surface is sharp angled, arcuate, or planar. Preferably, the said heating side surface can be set in one with the said heating bottom surface.

The present invention also provides another solution:

a heating tank for the fusion splicer, which comprises a heating tank body and a heating tank upper cover, among which, the said heating tank body is used to accommodate a heat shrinkable tube wrapped with a fiber welding point and heated to shrink the heat shrinkable tube.

Preferably, the said heating tank body comprises a heating side surface and a heating bottom surface, while the said heating side surface and the heating bottom surface are connected with each other, and the heat shrinkable tube comes into contact with at least either the heating side surface or the heating bottom surface during the preheating and thermal shrinkage;

the said heating tank upper cover comprises a pressing portion, while the said pressing portion is narrower than the opening of the said heating tank body, and comes into contact with the heat shrinkage tube and exerts an acting force during the preheating and thermal shrinkage of the tube.

Further, the said heating tank upper cover comprises a connecting portion, while the said connecting portion comprises a magnetic body; the said heating tank body comprises a magnetic body or a magnetizer.

Further, the pressure generated due to the mutual absorption between the magnetic body of the said connecting portion and the magnetic body or the magnetizer of the said heating tank body is smaller than the pressure required for the deformation of the heat shrinkable tube casing in the unheated state and is larger than the pressure required for the deformation of the heat shrinkable tube casing to be heated and softened during heating; in the unheated state, the magnetic body of the said connecting portion is separated from the magnetic body or the magnetizer of the said heating tank body, and the said magnetic body or the magnetizer is sucked during the preheating and thermal shrinkage, and the said heating tank upper cover moves to the said heating tank body, and the said pressing portion exerts an acting force on the heat shrinkable tube.

Further, the material of the said pressing portion is a hard material.

Further, the said pressing portion is set in one with the said heating tank upper cover.

Further, the heating surface of the said heating tank body is a heat generating element having a heat generating function per se or a surface having a heat conduction component connected to the heat generating source.

Further, the said heating side comprises two heating surfaces, and an included angle is formed between the said two heating surfaces or the extended planes thereof, and the said heating bottom surface is sharp angled, arcuate, or planar.

The present invention also provides a fusion splicer, which is provided with a heat shrinkable device, and the said heat shrinkable device comprises a heating tank, wherein, the heating tank is a heating tank for the above-mentioned fusion splicer.

The beneficial effects of the present invention are:

1. To quicken the thermal shrinkage process and shorten thermal shrinkage time. The pressing portion is provided to exert an acting force on the heat shrinkable tube during the preheating and thermal shrinkage of the tube so that the contact area between the heat shrinkable tube and the heating tank is increased to accelerate the heating rate so as to realize a significant decrease of thermal shrinkage time and improve operating efficiency.

2. The heating part has a plurality of heating surfaces, and these heating surfaces are always in contact with the heat shrinkable tube during the thermal shrinkage and decline of the heat shrinkable tube, which can greatly improve the heat conduction efficiency.

3. The invention has the advantages of simple structure and low processing cost, which effectively achieve the goal of reducing the product cost.

REFERENCE NUMBERS IN THE FIGURE

Figure 1:
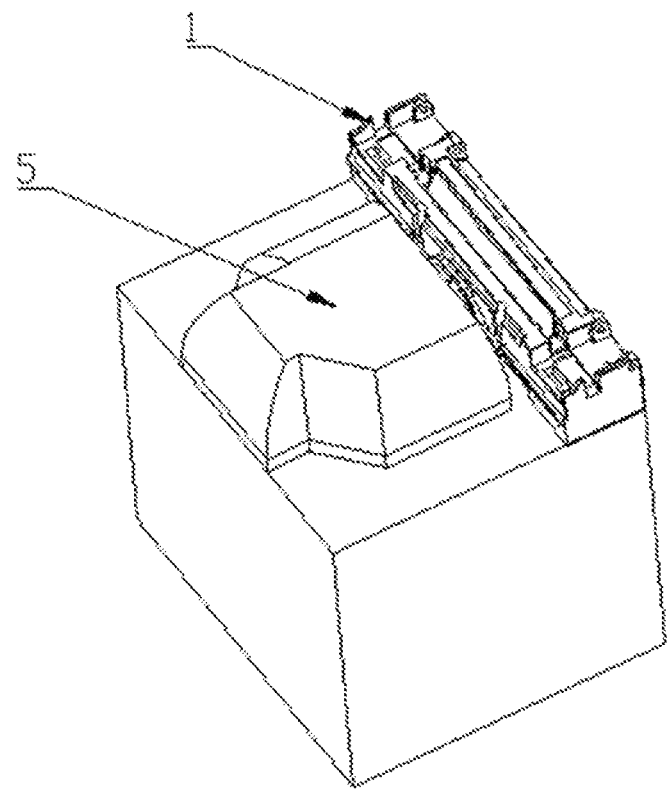
FIG. 1 is a schematic view showing a heating tank for the fusion splicer being installed in the fusion splicer according to the present invention.

1 Heating tank body
2 Heating tank upper cover
3 Rotating shaft portion
4 Heat shrinkable tube
5 Fusion splicer windshield
11 Heating side surface
12 Heating bottom surface
13 Opening
21 Pressing portion
22 Connecting portion

DETAILED DESCRIPTION OF EMBODIMENTS

Hereinafter, the present invention will be described further with reference to the preferred embodiments and with reference to the accompanying drawings.

Embodiment 1

As shown in FIG. 1, a new and efficient heating tank for the fusion splicer disclosed in the present invention, in which, the whole heat shrinkage device is located outside the windshield of the fusion splicer. In the specific operation, the fiber is welded inside the windshield of the fusion splicer, and after the welding process is completed, the heat shrinkable tube 4 is sleeved outside the welding point, and then the heat shrinkable tube 4 is placed on the heating tank for thermal shrinkage, after the completion of the shrinkage process, the heat shrinkable tube 4 contracted due to heat is wrapped around the welding point to reinforce the welding point to extend the life.

Figure 2:
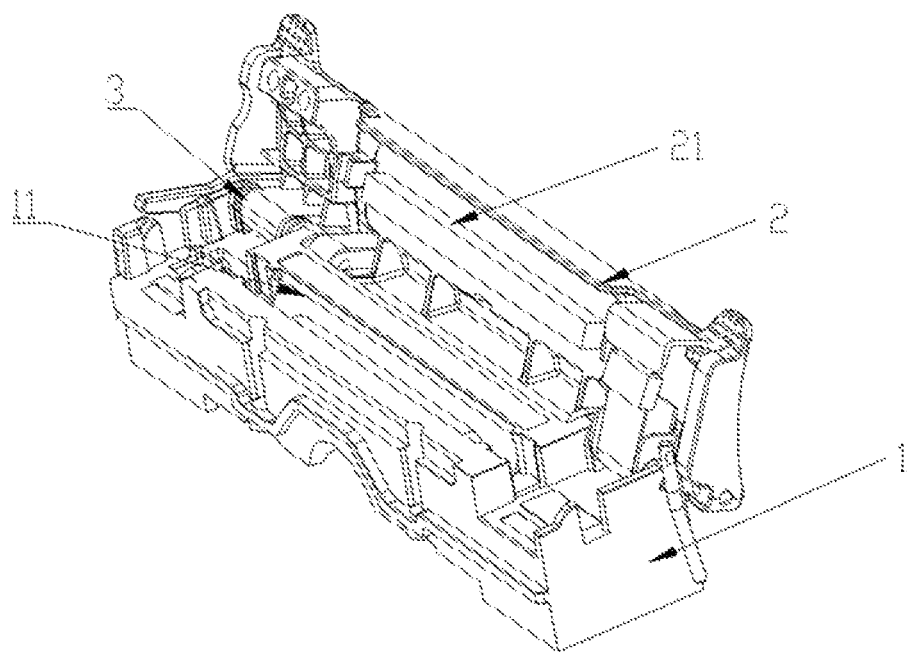
FIG. 2 is a schematic view showing the three-dimensional structure of the whole heating tank according to the present invention.
Figure 3:
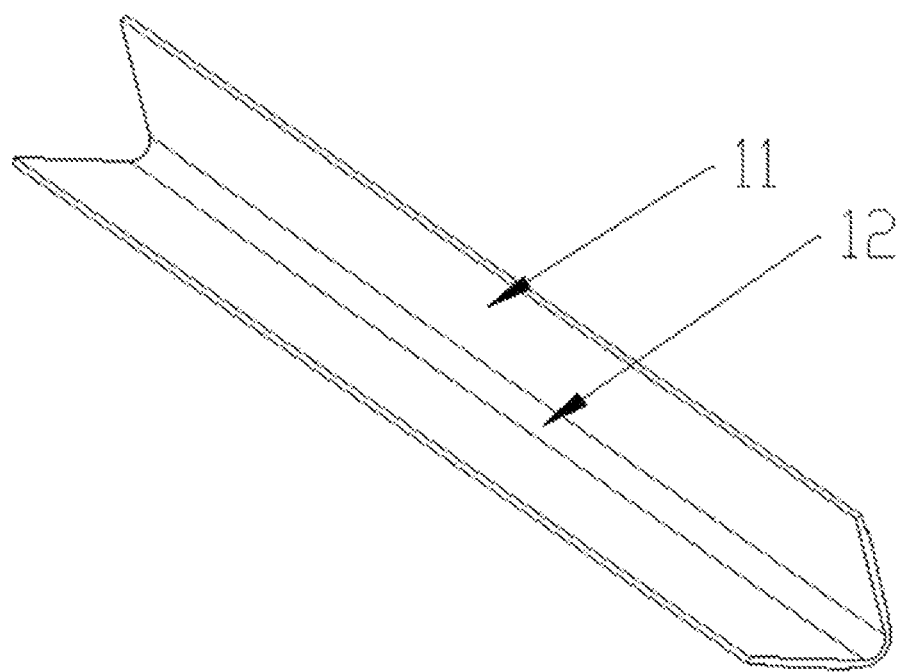
FIG. 3 is a schematic view showing the three-dimensional structure of the heating tank according to the present invention.

As shown in FIG. 2, a new and efficient heating tank for the fusion splicer disclosed in the present invention comprises a heating tank body 1 and a heating tank upper cover 2, and one end of the said heating tank upper cover 2 is pivotally connected with the said heating tank body 1, and the other end is engaged or magnetically sucked with the said heating tank body 1. Specifically, a rotating shaft portion 3 is provided at the pivotal connection of the heating tank body 1 and the heating tank upper cover 2, and the said heating tank upper cover 2 is provided with a connecting portion 22, and the said connecting portion 22 may be provided in two ways. For way 1, a snap-fit boss is provided and the said heating tank body 1 is provided with a mating recess; for way 2, the heating tank upper cover 2 and the heating tank body 1 are provided with mutually attracting magnetic bodies at positions corresponding to each other at the connecting portion 22, and the heating tank upper cover can be opened or closed in both ways.

Figure 4:
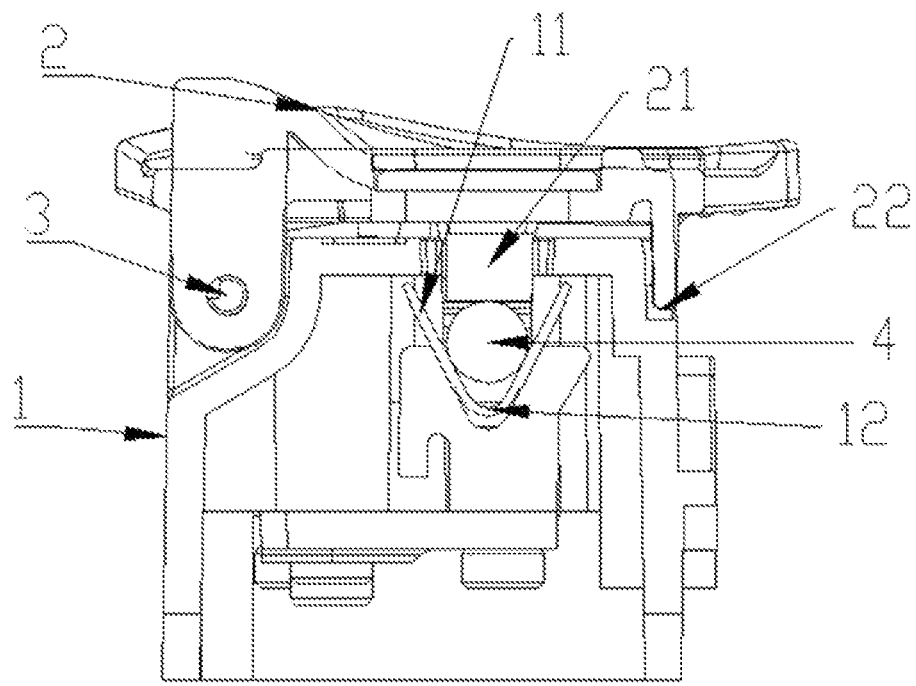
FIG. 4 is an exploded view showing a heating tank for the fusion splicer according to the present invention.
Figure 5:
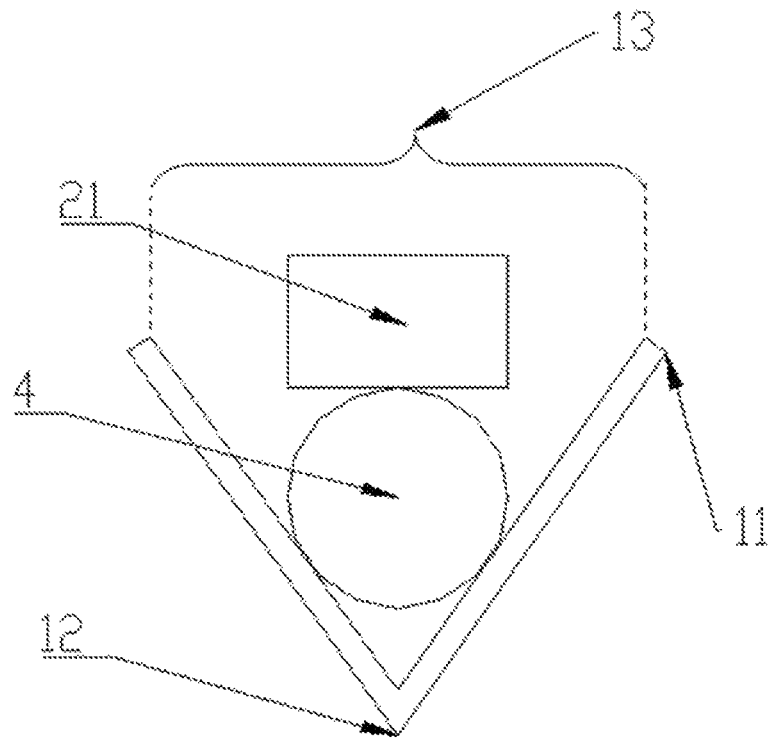
FIG. 5 is a schematic view showing the section structure of the heat shrinkage device of the heating tank according to the present invention.
Figure 6A:
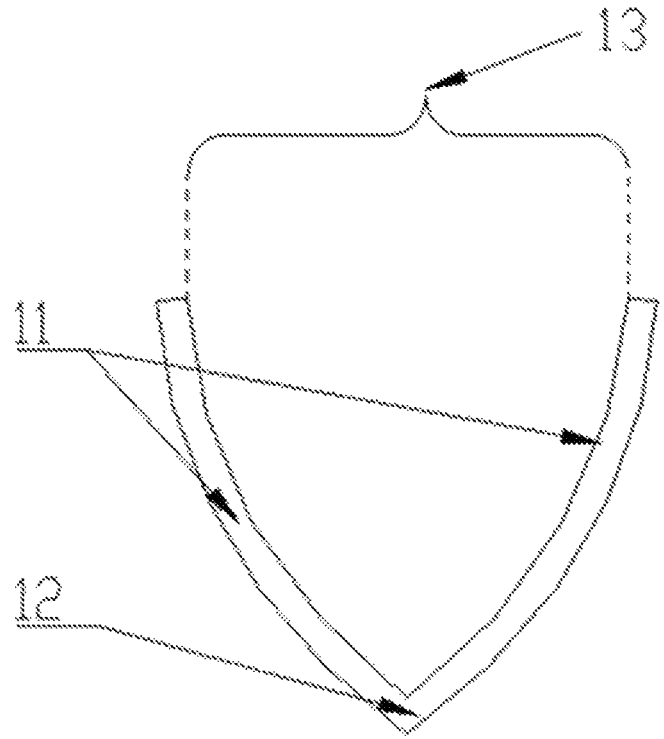
FIG. 6A is a schematic view showing the section structure of an embodiment of the heating tank according to the present invention.
Figure 6B:
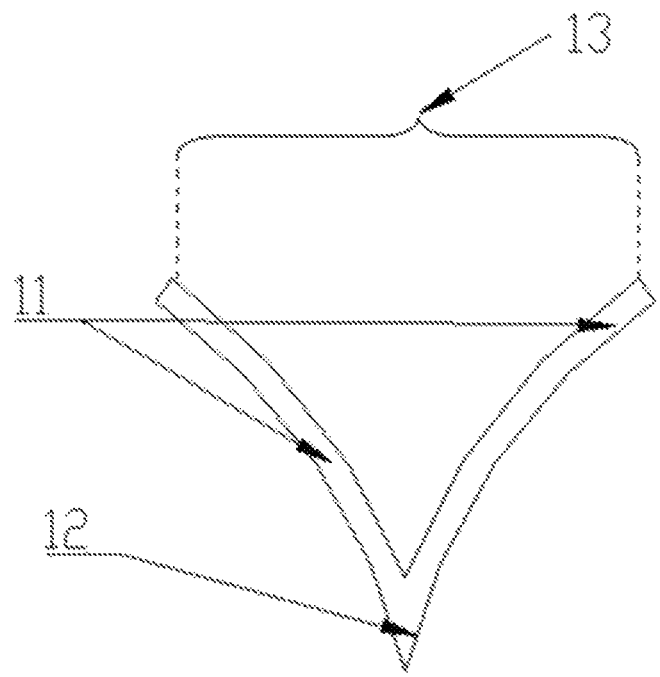
FIG. 6B is a schematic view showing the section structure of another embodiment of the heating tank according to the present invention.
Figure 6C:
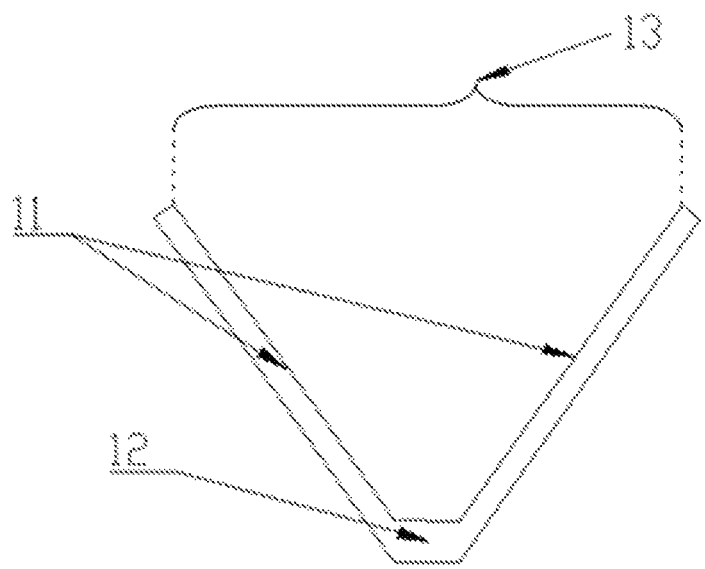
FIG. 6C is a schematic view showing the section structure of a further embodiment of the heating tank according to the present invention.

As shown in FIG. 3 through 6B, the said heating tank body 1 comprises two heating side surfaces 11 and a heating bottom surface 12, while the said heating side surface 11 and the heating bottom surface 12 are connected with each other, and the said heating side surface 11 and the heating bottom surface 12 can be separately or integrally molded. The cross section of the heating tank body 1 is approximately "V" shaped (as shown in FIG. 5). Specifically, the heating side surface 11 may be set to be arcuate (as shown in FIG. 6A or FIG. 6B) or straight (as shown in FIG. 4 and FIG. 5), and the heating bottom surface 12 may be set to be sharp angled (as shown in FIG. 5), or arcuate (as shown in FIG. 4), or planar (as shown in FIG. 6C). This structure allows the heating tank to have 2 surfaces in contact with the heat shrinkable tube 4 during heating all the time.

The heating substrate of the said heating tank body 1 is a heat generating element having a heat generating function per se or a surface inside the heating tank body in contact with the heat shrinkable tube 4 is a surface having a heat conduction component connected to the heat generating source.

As shown in FIG. 4 to 6B, the said heating tank upper cover 2 comprises a pressing portion 21, while the pressing portion 21 is narrower than the opening 13 of the said heating tank body 1, and it is either glued or interlocked with the upper cover 2. In the present embodiment, preferably, the pressing portion 21 is adhesively connected with the upper cover 2. The said pressing portion 21 is a deformable elastic mechanism, and the pressure generated by the deformation of the elastic mechanism of the said pressing portion is smaller than the pressure required for the deformation of the heat shrinkable tube casing in the unheated state and is larger than the pressure required for the deformation of the heat shrinkable tube casing to be heated and softened during heating, and high temperature resistant soft material is preferred. In the present embodiment, the pressing portion 21 is preferably made of high temperature resistant foam plastic.

In operation, the optical fiber cased in the heat shrinkable tube 4 is placed in the "V"-shaped groove of the heating tank body 1. At this time, the heat shrinkable tube is in contact with the two heating side surfaces 11 and the contact surface is linear; the heating tank upper cover 2 is closed, then the heat shrinkable tube 4 is in a non-heated state and is hard. Since the pressure required for the deformation of the casing of the heat shrinkable tube 4 at this time is greater than the pressure generated by the deformation of the pressing portion 21, the pressing portion 21 is in contact with the heat shrinkable tube 4 and is in a contracted state while the heat shrinkable tube 4 is brought into close contact with the heating side surface 11. After the heating process is started, the heating side surface 11 is heated and the heat shrinkable tube 4 becomes soft and contracted due to heat. At this time, the pressure generated by the deformation of the pressing portion 21 starts to gradually become larger than the pressure required for the deformation of the casing of the heat shrinkable tube 4, and the heat shrinkable tube 4 is gradually pressed against the heating side surface 11 so that the area that the heat shrinkable tube 4 comes in contact with the heating side surface 11 increases, thus accelerating the heat shrinkage process and shortening the heat shrinkage time.

Embodiment 2

The second embodiment of the present invention relates to a new and efficient heating tank for the fusion splicer, having the substantially same structure as in the first embodiment, except that the said pressing portion 21 is preferably made of a hard material and one end of the heating tank upper cover 2 and the said heating tank body 1 are provided with mutually attracted magnetic bodies at positions corresponding to each other. Preferably, the pressing portion 21 is integrally formed with the heating tank upper cover 2.

Figure 7:
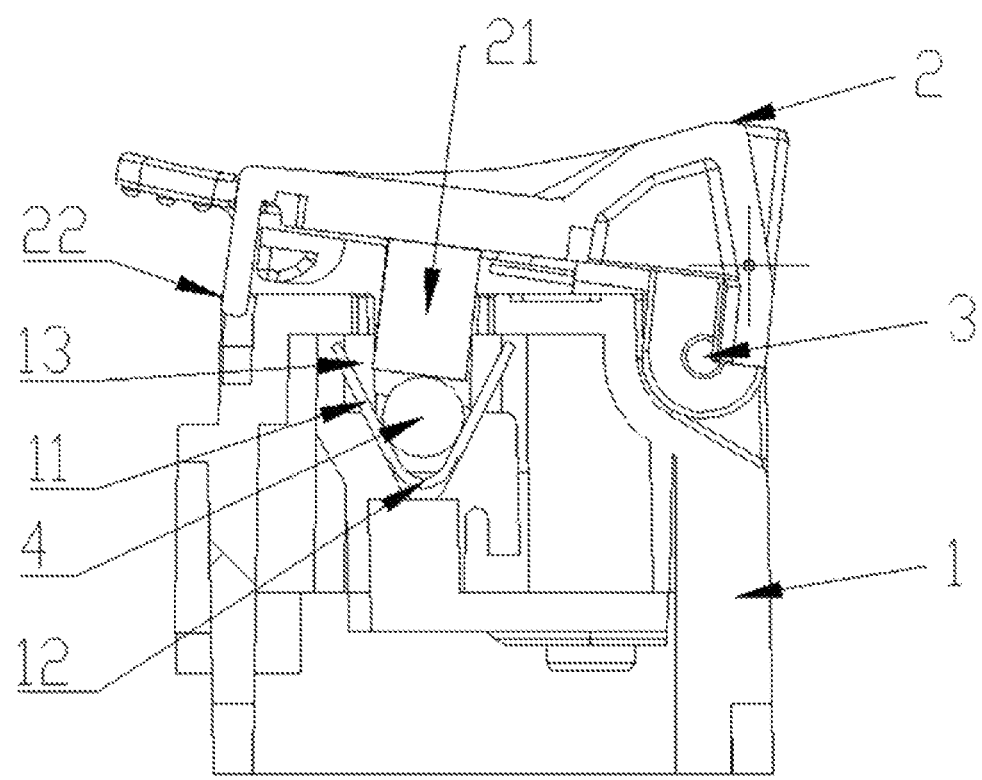
FIG. 7 is a schematic view showing the section structure of the heat shrinkage device in the unheated state according to the present invention.
Figure 8:
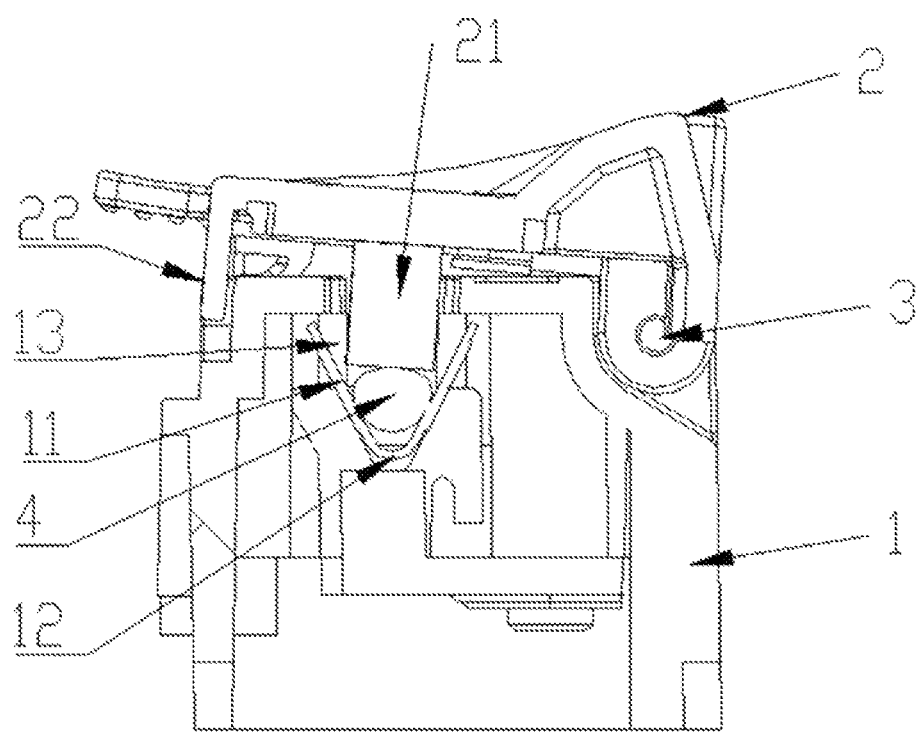
FIG. 8 is a schematic view showing the section structure of the heat shrinkage device in the state of use according to the present invention.
Figure 9:
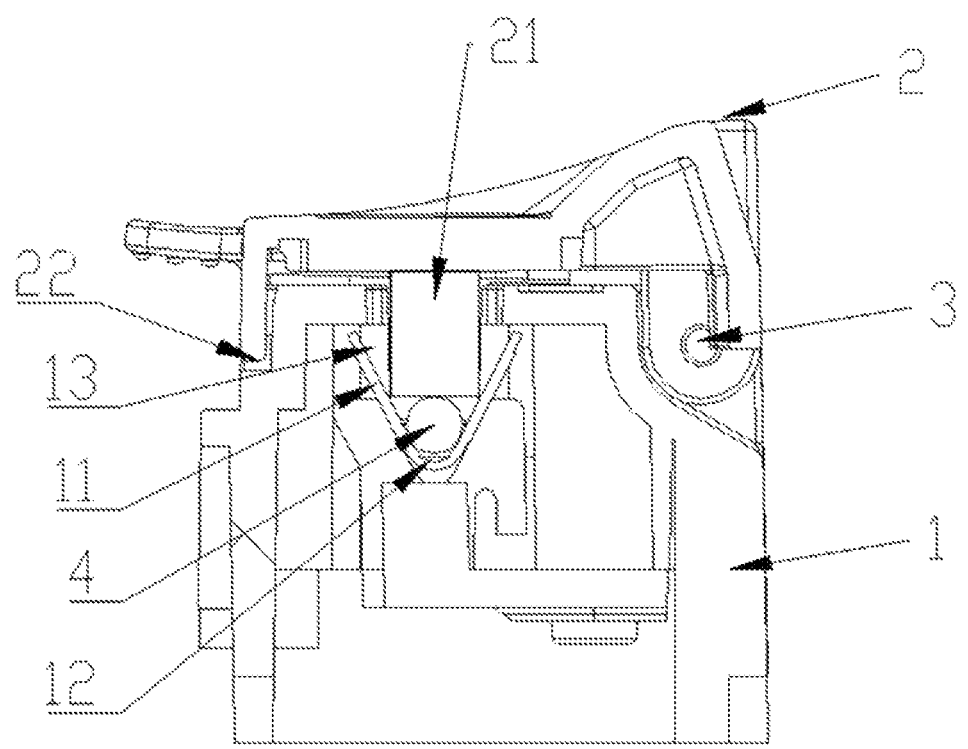
FIG. 9 is a schematic view showing the section structure of the heat shrinkage device after the thermal shrinkage process according to the present invention.

As shown in FIGS. 7 to 9, one end of the said heating tank upper cover 2 and the said heating tank body 1 are provided with mutually attracted magnetic bodies at positions corresponding to each other. For example, the heating tank upper cover 2 and the heating tank body 1 are provided with magnets having suction force with each other, alternatively, a magnet having suction force is provided on the heating tank upper cover 2, and a magnetizer is provided on the heating tank body 1, alternatively, a magnet having suction force is provided on the heating tank body and a magnetizer is provided on the heating tank upper cover 2. The present invention is not limited to the arrangement of the magnetic body. The other end of the heating tank upper cover 2 is pivotally connected with the said heating tank body 1.

At the same time, the connection between the heating tank upper cover 2 and the heating tank main body 1 may be provided in such a manner that both ends of the heating tank upper cover 2 are provided with magnetic bodies, and both ends of the heating tank body 1 are also provided with magnetic bodies at corresponding positions, and the heating tank upper cover 2 and the heat tank body 1 are fully engaged under the magnetic force, and the present invention is not limited thereto.

In this embodiment, preferably, the magnetic bodies are provided at the connecting portion 22 of the heating tank upper cover 2, and the pressure generated by the mutual attraction of the said magnetic bodies is smaller than the pressure required for the deformation of the heat shrinkable tube casing in the unheated state and is larger than the pressure required for the deformation of the heat shrinkable tube casing to be heated and softened during thermal shrinkage. In the unheated state, the magnetic body of the heating tank upper cover 2 is separated from the magnetic body of the said heating tank body 1 due to the support of the heat shrinkable tube casing and the pressing portion 21. After the heating process is started, the heating side surface 11 is heated, the heat shrinkable tube 4 is softened and contracted due to heat, then the said magnetic bodies are attracted to each other, the heating tank upper cover 2 is moved toward the said heating tank body 1, and the said pressing portion 21 applies a force to the heat shrinkable tube 4, so that the contact area between the heat shrinkable tube 4 and the heating side surface 11 is increased, thus accelerating the thermal shrinkage process and shortening the thermal shrinkage time until the magnetic body of the heating tank upper cover 2 is engaged with the magnetic body of the said heating tank body 1. The pressing of the pressing portion 21 is completed.

The above has been described in detail with respect to the specific embodiments of the present invention. It will be apparent to those skilled in the art that various modifications and adaptations may be made to the present invention without departing from the principles of the invention, which are also intended to be within the scope of the appended claims.

What is claimed is:

1. A heater for a fusion splicer comprising:
   a heating body comprising a first heating side surface, a second heating side surface and a heating bottom surface, wherein the said first and second heating side surfaces are each connected to the heating bottom surface and the first and second heating side surfaces each have a respective upper edge, wherein the respective upper edges of the first and second heating side surfaces are separated by a first distance, wherein the heating body is configured such that a heat shrinkable tube comes into contact with the first and second heating side surfaces and/or the heating bottom surface during preheating and thermal shrinkage of the heat shrinkable tube to shrink the heat shrinkable tube onto a fiber weld;

an upper cover comprising a deformable elastic member, wherein the deformable elastic member has a width which it is narrower than the first distance separating the respective upper edges of the first and second heating side surfaces, and wherein the upper cover is configured such that the deformable elastic member comes into contact with the heat shrinkable tube and exerts a first pressure on the heat shrinkable tube during the preheating and thermal shrinkage of the heat shrinkable tube.

2. The heater for a fusion splicer according to claim 1, wherein the deformable elastic member is configured such that:

the first pressure exerted by the deformable elastic member is smaller than a second pressure required for deformation of the heat shrinkable tube when the heat shrinkable tube is in an unheated state, and the first pressure exerted by the deformable elastic member is larger than a third pressure required for deformation of the heat shrinkable tube when the heat shrinkable tube is in a heated and softened condition during the preheating of the heat shrinkable tube;

wherein the deformable elastic member is configured to be in a compressed state when the heat shrinkable tube is in the unheated state, and the deformable elastic member is configured to gradually expand from the compressed state during the preheating and thermal shrinkage of the heat shrinkable tube to exert an acting force on the heat shrinkable tube.

3. The heater for a fusion splicer according to claim 2, wherein the deformable elastic member comprises a high temperature resistant soft material.

4. The heater for a fusion splicer according to claim 3, wherein the deformable elastic member comprises a high temperature resistant foam plastic.

5. The heater for a fusion splicer according to claim 3, wherein:

the heating body comprises a heat generating element which defines the first heating side surface; or the heating body is thermally conductive and the heater for a fusion splicer further comprises a heat source connected to the heating body.

6. The heater for a fusion splicer according to claim 5, wherein a plane containing the first heating side surface is at an angle with a plane containing the second heating side surfaces, and the heating bottom surface is sharpy angled, arcuate, or planar.

7. A heater for a fusion splicer, comprising:

a heating body comprising a first heating side surface, a second heating side surface and a heating bottom surface, wherein the first and second heating side surfaces are each connected to the heating bottom surface and the first and second heating side surfaces each have a respective upper edge, wherein the respective upper edges of the first and second heating side surfaces are separated by a first distance, wherein the heating body is configured such that a heat shrinkable tube comes into contact with the first and second heating side surfaces and/or the heating bottom surface during preheating and thermal shrinkage of the heat shrinkable tube to shrink the heat shrinkable tube onto a fiber weld;

an upper cover comprising a pressing portion member, wherein the pressing member has a width which is narrower than the first distance separating the respective upper edges of the first and second heating side surfaces, and wherein the upper cover is configured such that the pressing member comes into contact with the heat shrinkable tube and exerts a first pressure on the heat shrinkable tube during the preheating and thermal shrinkage of the heat shrinkable tube; and a lower housing, wherein the heating body is located in the lowing housing;

wherein the upper cover further comprises a first magnetic body and the lower housing further comprises a magnetic source, the magnetic source comprising a second magnetic body or a magnetizer, the first magnetic body and the magnetic source being positioned to allow a magnetic force of attraction between the upper cover and the lower housing.

8. The heater for a fusion splicer according to claim 7, wherein:

the upper cover and lower housing are configured such that the magnetic force of attraction between the upper cover and the lower housing causes the pressing member to exert the first pressure on the heat shrinkable tube;

the first pressure exerted by the pressing member is smaller than a second pressure required for deformation of the heat shrinkable tube when the heat shrinkable tube is in an unheated state;

the first pressure exerted by the pressing member is larger than a third pressure required for deformation of the heat shrinkable tube when the heat shrinkable tube is in a heated and softened condition during the preheating of the heat shrinkable tube; and the upper cover and lower housing are configured such that when the heat shrinkable tube is in the unheated state, the first magnetic body of the upper cover is separated from the magnetic source of the lower housing, and the upper cover and lower housing are further configured such that the first magnetic body moves towards the magnetic source during the preheating and thermal shrinkage of the heat shrinkable tube thereby causing the upper cover to move toward the lower housing which causes the pressing member to continue to exert the first pressure on on the heat shrinkable tube.

9. The heater for a fusion splicer according to claim 8, wherein the pressing member comprises a hard material.

10. The heater for a fusion splicer according to claim 9, wherein:

the heating body comprises a heat generating element which defines the first heating side surface; or the heating body is thermally conductive and the heater for a fusion splicer further comprises a heat source connected to the heating body.

11. The heater for a fusion splicer according to claim 10, wherein a plane containing the first heating side surface is at an angle with a plane containing the second heating side surface, and the heating bottom surface is sharpy angled, arcuate, or planar.

12. A fusion splicer comprising;

a fiber welder, and the heater for a fusion splicer according to claim 7.

* * * * *